(12) United States Patent
Sedzin et al.

(10) Patent No.: US 9,604,134 B2
(45) Date of Patent: Mar. 28, 2017

(54) DEVICE CONTROL SYSTEM AND METHOD OF DETERMINING ALTITUDE

(71) Applicant: ams International AG, Rapperswil-Jona (CH)

(72) Inventors: Aliaksei Vladimirovich Sedzin, Eindhoven (NL); Willem Frederik Adrianus Besling, Eindhoven (NL)

(73) Assignee: AMS INTERNATIONAL AG, Rapperswil-Jona (CH)

( * ) Notice: Subject to any disclaimer, the term of this patent is extended or adjusted under 35 U.S.C. 154(b) by 740 days.

(21) Appl. No.: 13/898,354

(22) Filed: May 20, 2013

(65) Prior Publication Data

US 2013/0316830 A1    Nov. 28, 2013

(30) Foreign Application Priority Data

May 23, 2012 (EP) .................... 12169016

(51) Int. Cl.

| A63F 13/217 | (2014.01) |
|---|---|
| A63F 13/218 | (2014.01) |
| G01C 25/00 | (2006.01) |
| G01C 5/06 | (2006.01) |
| A63F 13/211 | (2014.01) |
| G06F 1/16 | (2006.01) |
| A63F 13/20 | (2014.01) |

(52) U.S. Cl.
CPC ............ *A63F 13/218* (2014.09); *A63F 13/06* (2013.01); *A63F 13/211* (2014.09); *G01C 5/06* (2013.01); *G01C 25/00* (2013.01); *G06F 1/1684* (2013.01); *A63F 13/217* (2014.09); *A63F 2300/1006* (2013.01); *A63F 2300/1012* (2013.01); *A63F 2300/1043* (2013.01)

(58) Field of Classification Search
CPC ...... A63F 13/21; A63F 13/217; A63F 13/218; A63B 2220/73; A63B 2220/74; G01L 13/06; G01L 15/00; G01C 25/00
See application file for complete search history.

(56) References Cited

U.S. PATENT DOCUMENTS

| 4,694,694 A | * | 9/1987 | Vlakancic ................ G01C 5/06 368/11 |
|---|---|---|---|
| 5,224,059 A | * | 6/1993 | Nitta ........................ G01C 5/06 368/11 |
| 5,402,116 A | * | 3/1995 | Ashley ................ G01S 7/4004 340/10.41 |

(Continued)

FOREIGN PATENT DOCUMENTS

| CN | 201094017 Y | 7/2008 |
|---|---|---|
| JP | 2011-117818 A | 6/2011 |

OTHER PUBLICATIONS

AIPN machine translation of JP 2011-117818A.*
Extended European Search Report for application No. 12169016.8 (Oct. 29, 2012).

*Primary Examiner* — Steven J Hylinski
(74) *Attorney, Agent, or Firm* — McDermott Will & Emery LLP

(57) ABSTRACT

A gaming system has a pressure measurement in the remote control (which may be the complete gaming apparatus) and this is used to derive a height of the remote control. In this way, barometric pressure measurement allows precise determination of the altitude of the game controller. The altitude information is then used to control the game.

15 Claims, 2 Drawing Sheets

(56) References Cited

U.S. PATENT DOCUMENTS

| | | | | |
|---|---|---|---|---|
| 5,646,857 A * | 7/1997 | McBurney | G01C 5/00 | 701/469 |
| 5,940,035 A * | 8/1999 | Hedrick | G01C 5/005 | 340/977 |
| 6,012,336 A * | 1/2000 | Eaton | B81C 1/00246 | 73/754 |
| 6,518,918 B1 * | 2/2003 | Vannucci | G01C 5/06 | 137/81.1 |
| 7,650,257 B2 | 1/2010 | Alexander et al. | | |
| 7,676,232 B2 * | 3/2010 | Wigren | G01S 5/0009 | 455/456.1 |
| 8,306,676 B1 * | 11/2012 | Ingvalson | G01C 5/06 | 244/180 |
| 9,234,965 B2 * | 1/2016 | Venkatraman | G01C 5/06 | |
| 2004/0033808 A1 * | 2/2004 | Rorabaugh | G01S 5/0289 | 455/456.1 |
| 2007/0030841 A1 * | 2/2007 | Lee | G01S 5/0027 | 370/352 |
| 2007/0218823 A1 * | 9/2007 | Wolf | G01C 5/06 | 454/72 |
| 2008/0096726 A1 * | 4/2008 | Riley | A63B 24/0006 | 482/8 |
| 2008/0280682 A1 | 11/2008 | Brunner et al. | | |
| 2009/0048044 A1 * | 2/2009 | Oleson | A63B 24/0062 | 473/570 |
| 2009/0217754 A1 * | 9/2009 | Binda | G01C 5/06 | 73/384 |
| 2011/0271764 A1 | 11/2011 | Lee | | |
| 2012/0013475 A1 * | 1/2012 | Farley | G01S 5/0045 | 340/665 |
| 2012/0046767 A1 | 2/2012 | Shimohata et al. | | |
| 2012/0072110 A1 * | 3/2012 | Venkatraman | G01C 5/06 | 701/434 |
| 2012/0083705 A1 | 4/2012 | Yuen et al. | | |
| 2013/0030700 A1 * | 1/2013 | Miller | G01C 21/16 | 701/500 |
| 2013/0045759 A1 * | 2/2013 | Smith | H04W 64/00 | 455/456.6 |
| 2013/0116958 A1 * | 5/2013 | Kristensson | H04B 5/0075 | 702/85 |
| 2013/0165195 A1 * | 6/2013 | Watterson | A63B 71/0616 | 463/6 |
| 2014/0164611 A1 * | 6/2014 | Molettiere | A61B 5/6838 | 709/224 |
| 2014/0200846 A1 * | 7/2014 | Wachter | G01C 5/06 | 702/138 |
| 2016/0033286 A1 * | 2/2016 | Gemelli | G01L 27/002 | 701/467 |

* cited by examiner

DEVICE CONTROL SYSTEM AND METHOD OF DETERMINING ALTITUDE

This invention relates to systems in which the position (and usually also orientation) of a hand-held controller is used as an input parameter to a device which hosts a software application. For example the invention can relate to gaming systems using game controllers of the type in which the position and orientation in space of the game controller is used to provide control of the game functions. The invention can also apply to controllers for controlling software applications other than games, for example remote controls for televisions or other devices.

Existing game controllers of this type such as the Wii (Trade Mark) remote use accelerometers to determine position changes and orientation changes of the device. Game controllers also use optical sensors to enable an absolute angular direction to be derived. Gyroscopes can also be used.

However, positional information derived from accelerometers is not reliable as they depend on the initial position of the controller, and suffer from a constantly growing integration error.

The invention is concerned in particular with errors in the altitude information derived in this way.

Any absolute positional information can enable improved accuracy of the positional information obtained from the remote control.

According to the invention, there are provided systems and a method as defined in the independent claims.

In one aspect, the invention provides a hand-held controller for controlling a software application, comprising a pressure sensor for providing relative altitude information for use in the control of the application.

This controller uses an absolute pressure measurement to derive relative altitude information. The altitude information can be relative to a calibration height or relative to another pressure sensor at a known height. This altitude information can then be used as one of the parameters for determining how to control the software application, which can for example be a video game.

A complete system such as a gaming system can comprise the controller which then has a screen for displaying graphics relating to the software.

The controller can for example comprise a processor for performing a calibration of the pressure sensor to associate a pressure sensor output with a known altitude level. In this way, altitude information can be obtained from a single sensor in the device. The controller can for example be a mobile phone having the software (e.g. game or remote control function).

In another set of embodiments, a system comprises a base unit and a remote control, wherein the remote control comprises the controller of the invention.

The system can further comprise a reference pressure sensor, wherein the system comprises a processor adapted to determine a relative height of the remote control with respect to the reference pressure sensor based on the two pressure sensor outputs.

This system thus uses differential barometric pressure measurement in two points, namely the remote controller and another fixed point, for example inside the base unit (the console). These two measurements are used to determine the altitude of the controller.

The remote control preferably comprises acceleration sensors for detecting movement in at least two orthogonal directions in the horizontal plane. Thus, the movement in three axes is obtained. The movement in the horizontal plane is detected by conventional acceleration sensors and the movement vertically is obtained by the pressure measurement approach of the invention.

The remote control can comprise an acceleration sensor for detecting movement in a vertical direction. In this way, the altitude information provided by the pressure measurement approach of the invention is used to supplement the information obtained from a conventional three-axis movement sensor arrangement.

The pressure sensor in the remote control can comprise a capacitive pressure sensor, such as a MEMS capacitive pressure sensor which can be provided over an integrated circuit.

Similarly, the reference pressure sensor can comprise a MEMS capacitive pressure sensor.

The reference pressure sensor can be provided in the base unit, but it can instead be a separate unit which can then be positioned independently of the base unit. For example it may be desirable for the reference pressure sensor to be positioned at the same height as a rest position of the remote control, for example at waist height.

In another aspect, the invention provides a base unit for a system, comprising:
means for receiving signals from a remote control, including a pressure sensor signal;
means for receiving a reference pressure sensor signal; and
a processor adapted to determine a relative height of the remote control with respect to the reference pressure sensor based on the reference pressure sensor signal and the received pressure sensor signal from the remote control.

In another aspect, the invention provides a method of deriving altitude information in respect of a remote control of a system comprising a base unit and a remote control, the method comprising:
measuring a pressure level using a pressure sensor in the remote control;
measuring a pressure level using a stationary reference pressure sensor;
combining the measured pressure levels to determine a relative height of the remote control with respect to the reference pressure sensor.

An example of the invention will now be described in detail with reference to the accompanying drawings, in which.

The invention provides a system in which a pressure measurement in a remote control (which may be the complete system) is used to derive a height of the remote control. In this way, barometric pressure measurement allows precise determination of the altitude of the controller. The altitude information is then used to control software, such as a video game.

Figure 1:
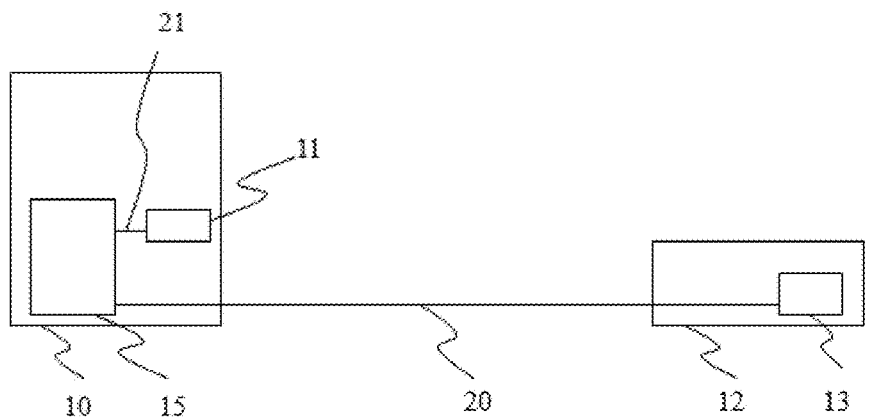
FIG. 1 shows a first example of a gaming system of the invention.

An embodiment of the invention is represented in FIG. 1. The components which form the basis of the invention are shown, and the other standard system components which are required are not represented.

The system comprises a base unit in the form of a video game console 10, and a remote control 12. The console 10 has a Central Processing Unit (CPU) 15, which is connected to a static reference pressure sensor 11 and to the remote control 12, by communication links 20 and 21. The remote control 12 has a pressure sensor 13 which is thus mobile. The link 21 can be wired and the link 20 can be wireless, although generally both links can be wired or wireless.

The pressure sensors are barometric sensors for measuring ambient pressure levels.

The reference barometric pressure sensor 11 can be positioned inside the video game console 10, but it can also be placed outside. The mobile barometric pressure sensor 13 is fixed to (or in) the remote control 12 of the system.

The CPU continuously receives pressure information from both pressure sensors 11 and 13. At the beginning of the operation, the mobile game controller 12 is placed so that both pressure sensors 11 and 13 are at the same altitude and a calibration is performed.

A 1-point calibration step can be used to define how the outputs of the pressure sensors are related when the difference of their altitudes is zero. This allows to get any sensor unknown offset to be cancelled. The sensor slope value is typically easier to control during the manufacture and that can be assumed as a constant which is known from the factory. This slope value is then used to obtain the altitude in a linear fashion.

A 2-point calibration can also be envisaged, with the $1^{st}$ point where both pressure sensors are positioned on the same level, and the $2^{nd}$ point where the controller is positioned at a defined height above/below the console's pressure sensor. This allows calibrating the sensor's slope value as well.

During the game, the game controller 12 moves up and down. The difference in pressure measured by sensors 11 and 13, and taking into account the calibration information, is translated to the corresponding difference in height. Subsequently this altitude information is used to control the game (e.g. determine the height of a tennis racket held by the game character).

In order to be able to track movement as function of altitude the sampling frequency should be sufficiently large. With state of the art pressure sensors using a piezoresistive read-out, a high sampling frequency is not feasible if high accuracy and low power consumption is required.

A high resolution and a high measurement frequency can however be achieved with low power consumption levels by using a capacitive read-out method which detects movement of a pressure-sensitive membrane.

NXP produces precise and energy efficient barometric pressure sensors suitable for this application. High precision pressure measurements allow detection of small changes in altitude (in the order of centimeters) at sufficiently high rate (100 Hz). Low power consumption allows such sensors to be used in low-power wireless devices.

These pressure sensors comprise Micro Electro Mechanical System (MEMS) pressure sensors. Currently most micro-machined pressure sensors use a hermetically sealed membrane that seals a reference cavity which is at a certain gauge pressure (for absolute pressure sensors the gauge pressure is a vacuum). The external pressure is measured because the pressure difference between the external pressure and the gauge pressure generates a force on the membrane, which causes the membrane to deflect. This deflection is then measured by capacitive measurement.

The pressure sensor can be integrated on top of a CMOS read-out circuit.

Figure 2:
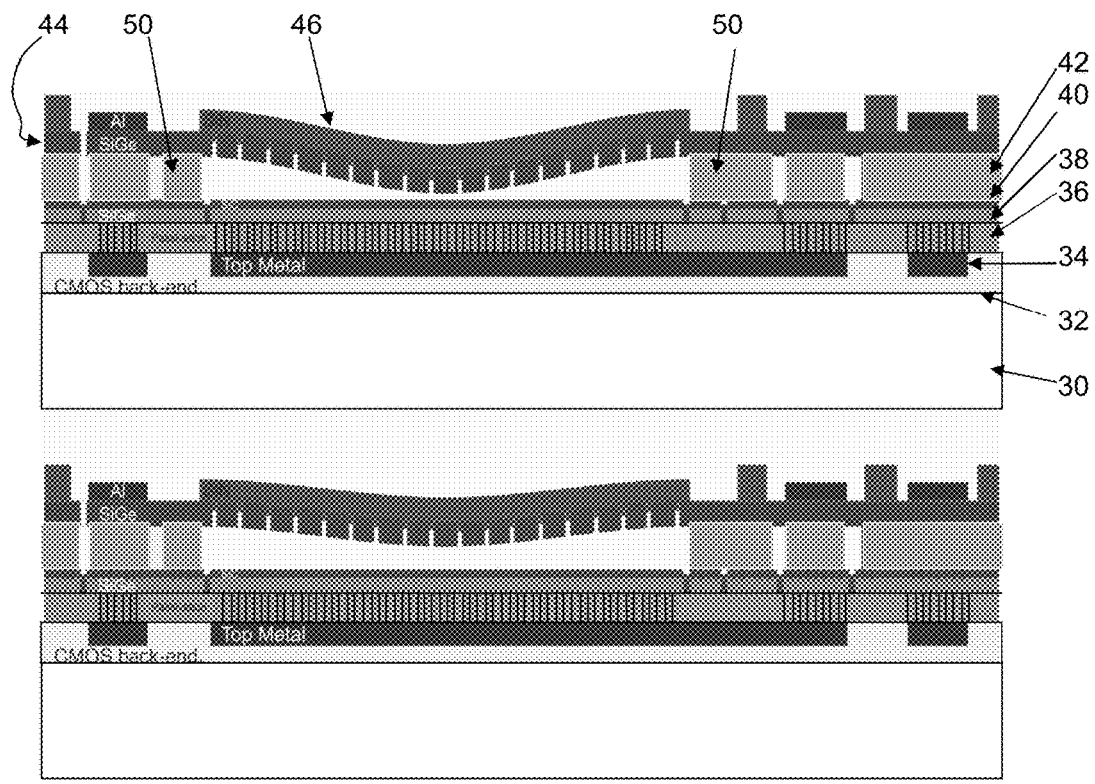
FIG. 2 shows an example of pressure sensor suitable for use in the system of FIG. 1.

FIG. 2 shows a cross section of a suitable capacitive pressure sensor, comprising a membrane with an integrated electrode which deflects under external applied pressure. The capacitance between the bottom and top electrode is a non-linear function of pressure. A higher pressure results in a higher capacitance as shown in the top image, compared to a lower pressure as shown in the bottom image.

In FIG. 2, the processed CMOS wafer is shown as 30, over which there is the CMOS back end 32 including a top metal layer 34. The capacitive sensor is provided over the CMOS back end 32 with a passivation layer 36 between.

The pressure sensor comprises a planar lower electrode which in this example comprises a silicon germanium layer 38 with a silicon carbide capping layer 40. However, an aluminium or tungsten bottom electrode may be used. The lower electrode connects to the CMOS top metal layer by means of standard interconnect vias. In this way the distance between the read-out circuitry and the capacitive sensor is reduced which is beneficial for parasitic capacitance reduction and reducing impact of EMI fields.

The top and bottom electrodes are spaced by a sacrificial oxide 42 which is removed in the regions between the capacitor electrodes.

By forming the pressure sensor on top of an integrated circuit, such as CMOS circuit, a fully integrated solution results. The top metal layer 34 of the CMOS circuit can be used to as a shielding plate for the overlying bottom electrode and also to enable the formation of interconnects.

The integration on CMOS enables an increase in signal to noise ratio as well as a reduction in parasitic capacitances by eliminating bond wires. Electrical connection to the pressure sensor bottom electrode is also accomplished via the metal interconnect 34 that lies below the bottom electrode. For this purpose, vias extend through the passivation layer 36 below the bottom electrode as shown, and these then also extend up through the passivation layer and the oxide 42 to connect to contact pads at the top of the structure.

Top contact pads can be used for the inputs and outputs of the circuit. In the FIG. 2 a contact pad is also shown that is in contact with the bottom capacitor electrode (through a lateral connection in the top metal layer). However, direct contact in this way is not necessary and the capacitor electrodes can instead make contact only to the underlying IC for signal processing. The contact pads are then used for the IC inputs and outputs.

A SiGe top electrode 44 and a sealing layer 46 are provided. The top electrode can comprise of tungsten, titanium, titanium nitride, aluminium and/or a combination of the above mentioned materials. Deposition methods for for the electrodes 34, 38, and 44 may comprise of Physical Vapor Deposition, High density plasma Sputtering, Plasma Enhanced Chemical Vapour Deposition (PECVD), Chemical Vapor Deposition (CVD), and Atomic Layer Deposition (ALD).

The sealing layer 46 is deposited after the sacrificial oxide removal, and it is used to fill the sacrificial etch openings which are formed over the cavity area of the pressure sensor. The sealing layer can comprises of silicon dioxide, silicon nitride, or a stacked combination of these materials. Deposition methods for silicon oxide are high density plasma oxide (HDP oxide), Plasma Enhanced Chemical Vapour Deposition (PECVD), Chemical Vapor Deposition (CVD), and Atomic Layer Deposition (ALD).

Aluminium contact pads provide the required connections to the device. SiGe-filled vias extend down from the top aluminium contact pads to the bottom electrode layer, and also from the bottom electrode layer to the CMOS top metal layer as desired, as outlined above. If a different material as top electrode is chosen, e.g. tungsten, the vias and anchor points are consequently filled with tungsten.

The SiC layer 40 is provided to prevent shorts between the top and bottom electrodes and to avoid etching of the SiN passivation layer 38 by the sacrificial HF vapour etch.

Vias are used not only as electrical connection paths, but also to form anchors 50. The anchors serve as an etch stop guard ring around the cavity but also are used to make contact of the top electrode to the underlying electronics.

There are numerous possible variations to the process flow. For example, a SiN layer can be provided over the bottom electrode instead of SiC, again to prevent shorts between the top and bottom electrode. This anti-shorting layer can instead be provided on top of the sacrificial oxide layer, or there may be a SiN layer both beneath and above the sacrificial etch oxide. One of these layers can be patterned to device anti-stiction bumps.

When a SiN layer is provided on top of the sacrificial oxide layer, it can become a support layer for the aluminium top electrode to avoid buckling.

The pressure sensor converts a capacitance into a digital signal. This has several important advantages over piezoresistive, dual die solutions.

A capacitive pressure sensor can achieve an excellent sensitivity of 5-10 fF/mbar/mm2 if it is operated close to its collapse point. In combination with a 16 bit analogue to digital convertor, an excellent resolution of less than 1 Pa/mm$^2$ sensor area can be obtained. For example, 1 Pa resolution/pressure difference corresponds to a height difference of 8.3 cm at sea level.

Figure 3:
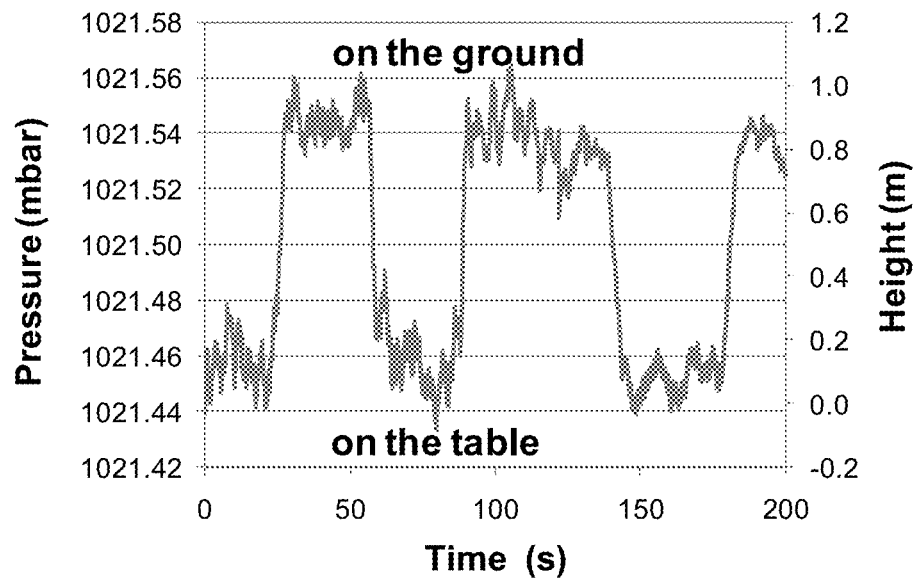
FIG. 3 shows the pressure response of an example of pressure sensor of the type shown in FIG. 2.

FIG. 3 shows an example of the achieved pressure resolution of a capacitive pressure sensor of the type shown in FIG. 2. Putting the sensor on the ground and on a table results in a pressure difference of 8 Pa. As a result, a height difference resolution of less than 10 cm can be easily obtained.

Another advantage of a capacitive readout is that per conversion cycle the power consumption is much smaller than for a piezoresitive read-out, which instead requires a high peak current to determine a small resistance change in the piezoresistive strain gauges. Typically the required current consumption is 100-1000 times smaller in order to achieve the same resolution. In combination with a relatively small conversion time (e.g. 10 ms) this results in a low overall power consumption at a relatively high measurement frequency. Typically, an energy consumption of 0.1-0.01 nJ is required for 1 mbar resolution per measurement whereas for 0.01 mbar typically 1-10 nJ is required per measurement (so that the product of energy consumption and resolution is in the range 0.01-0.1 nJ*mbar). The conversion time is still very small which allows an output of for example 100 measurements per second (i.e. 100 Hz).

Piezoresistive pressure sensors that are now finding their way in mobile phones and tablets have typically a measurement frequency of 1 Hz to limit their overall power consumption.

In order to achieve sufficient resolution in their measurement, piezoresistive pressure sensors use a high peak current (0.5-1.5 mA) to be able to measure small resistance changes in the piezoresistors. In order to improve noise long measurement times and/or large oversampling is required. In order to achieve 1 mbar resolution for one conversion cycle typically 10-100 nJ is required (so that the product of energy consumption and resolution is in the range 10-100 nJ*mbar). The conversion time is limited to 1 measurement per second due to the large oversampling (1024x-2048x). High measurement frequencies are thus not possible if high resolution (such as 0.01 mbar i.e. 8 cm height resolution) is required.

A piezoresistive Si membrane is also less sensitive than a capacitive membrane for the same available surface area. i.e. the change in voltage relative to the static voltage level (dV/V) per mbar is typically 10-100 uV/V·mbar for the piezoresistive sensor or 100 ppm/mbar. The change in capacitance relative to the static capacitance (dC/C) per mbar is typically 1-10 fF/pF·mbar for the piezoresistive sensor or 10000 ppm/mbar.

Another advantage of a capacitive pressure sensor is that it can be integrated on top of a CMOS read-out circuit as explained above. This reduces the parasitic coupling compared to the use of two separate dies. Hence the signal to noise ratio can be improved using an integrated approach. Moreover, a single die results in a significantly reduced form factor (factor 5) compared to a dual die solution—typical dimensions are 3 mm×3 mm for a piezoresistive pressure sensor versus 1.4 mm×1.4 mm for a capacitive pressure sensor. In addition, other sensor functionalities can be co-integrated on the read-out chip allowing calibration, signal correction/compensation (e.g. for temperature) and even to cancel out cross sensitivities for other sensor modalities.

The use of a capacitive MEMS sensor is preferred for the reasons explained above of low power consumption and high accuracy per unit sensor area. However, the invention can be implemented with any pressure sensor—the pressure sensor to be used will be selected depending on the desired resolution of the altitude measure and the desired power consumption levels.

The altitude information can be combined with any existing positional information to add an extra degree of certainty to the position derived. These additional positional measures can for example be based on acceleration sensors, gyroscopes or optical tracking.

As the pressure sensor is an absolute pressure sensor it can also re-zero at the start of the game. The height information and the relative changes are then taken from that particular reference point. Thus, the separate reference pressure sensor described above for the first example of system of the invention is not essential and the altitude information can instead be worked out in the controller.

In practice, some information needs to be transmitted to the console/base station to calculate the movement on the TV screen/monitor, so either the pressure measurement is transmitted to the console or the (relative) altitude.

Figure 4:
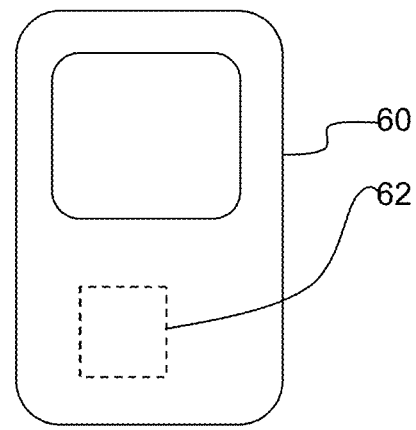
FIG. 4 shows a second example of a gaming system of the invention.

In the example above, the gaming system comprises a base unit (console) and hand-held controller. However, the gaming system can be entirely a hand-held unit such as a mobile phone. In this case, a screen on the game controller is used and there is no separate game console. The game controller thus needs to generate its own reference altitude point. This can be achieved as mentioned above, by carrying out a zeroing operation at the beginning of a game (without the need for a reference pressure sensor), for example. Thus, the invention can be implemented simply as a single pressure sensor in a (hand-held) controller. FIG. 4 shows a mobile telephone 60 with a screen and a built in pressure sensor 62. The mobile phone provides the full gaming functions.

The pressure sensor is for providing relative height information, since some comparison needs to be made to interpret the pressure sensor readings. This comparison can be with respect to a reference pressure sensor or with respect to a calibration operation, as will be clear from the discussion above.

In some applications, only the relative height information is needed to control a game. However, in most cases, other positional information of the controller is derived, using known position sensing. By way of example, other types of altitude/position detection are based on magnetic sensors, ultrasound sensors (such as sonar), airflow measurement, radar and laser range-finding. The pressure measurement information of the invention can be combined with any of these sensing approaches.

It will be clear from the description above that the processing of the pressure sensor readings can be carried out in various ways. In the case of a gaming system comprising only the hand-held controller, the processing is within the controller itself and there is no need for communication to a remote piece of apparatus. In the case of a gaming system with a base unit (console) and controller, if a reference pressure sensor is used, then the reference pressure sensor reading can be sent to the controller, and the controller can then derive the altitude information for sending to the console to control the game. Alternatively, the controller can send its pressure reading to the console where the information is then processed with the reference pressure information for controlling the game. The reference pressure can be part of the console or a separate unit at a fixed height.

In the case of a gaming system with a base unit (console) and controller, but without a reference pressure sensor (because a calibration process is used), then the controller can either send the pressure readings to the console or it can work out the relative altitude information and send this to the console.

Of course, even when a reference pressure sensor is used, calibration operations can still be used.

The examples above use the altitude information to control a game. The invention can however be used in non-gaming applications. For example, one function commonly implemented by a remote control is a mouse pointer function, whereby a user points to a particular point on a screen. This function can be used equivalently in games and in other software applications, such as device menu selections. By using altitude information to control a pointer height, the movement can be made more intuitive, since the system does not rely solely on small angular deviations of the direction of the controller. These angular deviations become smaller the further the user is from the screen, which can make the pointer movements too large and therefore difficult to control. Mobile phones are increasing being used as interfaces to TVs and monitors, and can include this functionality to improve the interface. Thus, the invention can use the pressure sensor signals to control (or contribute to the control of) the height of a pointer up a screen.

The invention is therefore of interest for any video game consoles and/or game controllers for games where altitude information is used, for example sports games such as boxing, tennis, golf, etc. It is also of interest for any software application receiving an input dependent on the position of a hand-held controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A system comprising:
    a base unit comprising a processor, the base unit hosting a software application;
    a remote control, wherein the remote control comprises
        a hand-held controller configured to control the software application, and
        a pressure sensor configured to provide relative altitude information adapted to be used in the control of the software application; and
    a reference pressure sensor provided in the base unit or in a separate unit at a fixed height,
    wherein the processor is adapted to
        determine calibration information depending on a relation between outputs of the pressure sensor of the remote control and the reference pressure sensor when a difference between an altitude of the pressure sensor of the remote control and an altitude of the reference pressure sensor is zero, and
        determine a relative height of the remote control with respect to the reference pressure sensor based on an output of the pressure sensor, on an output of the reference pressure sensor and on the calibration information.

2. The system as claimed in claim 1, wherein the controller comprises a screen configured to display graphics relating to the software.

3. The system as claimed in claim 1, wherein the reference pressure sensor comprises a MEMS capacitive pressure sensor.

4. The system as claimed in claim 1, wherein the remote control comprises acceleration sensors configured to detect movement in at least two orthogonal directions in the horizontal plane.

5. The system as claimed in claim 4, wherein the remote control comprises an acceleration sensor configured to detect movement in a vertical direction.

6. The system as claimed in claim 1, wherein the controller pressure sensor for providing relative altitude information comprises a capacitive pressure sensor.

7. The system as claimed in claim 6, wherein the controller pressure sensor for providing relative altitude information comprises a MEMS capacitive pressure sensor.

8. The system as claimed in claim 7, wherein the controller pressure sensor is provided over an integrated circuit.

9. The system as claimed in claim 7, wherein the controller pressure sensor is integrated on top of a CMOS read-out circuit.

10. The system as claimed in claim 1, wherein the base unit comprises:
    means configured to receive signals from the remote control, including a pressure sensor signal from the pressure sensor;
    means configured to receive a reference pressure sensor signal from the reference pressure sensor; and
    the processor, wherein the processor is adapted to determine a relative height of the remote control with respect to the reference pressure sensor based on the reference pressure sensor signal and the received pressure sensor signal from the remote control.

11. The system as claimed in claim 1, wherein the processor is adapted to determine the calibration information further depending on a relation between outputs of the pressure sensor of the remote control and the reference pressure sensor when a difference between an altitude of the pressure sensor of the remote control and an altitude of the reference pressure sensor is given by a defined calibration height.

12. A method of deriving altitude information in respect of a remote control of a system comprising a base unit and a remote control,
　　wherein the base unit comprises a processor and hosts a software application,
　　the method comprising:
　　　　measuring a pressure level using a pressure sensor in the remote control;
　　　　measuring a pressure level using a stationary reference pressure sensor, the reference pressure sensor provided in the base unit or in a separate unit at a fixed height;
　　　　determining, by the processor, calibration information depending on a relation between outputs of the pressure sensor of the remote control and the reference pressure sensor when a difference between an altitude of the pressure sensor of the remote control and an altitude of the reference pressure sensor is zero;
　　　　combining, by the processor, the measured pressure levels to determine a relative height of the remote control with respect to the reference pressure sensor based on the measured pressure levels and the calibration information; and
　　　　controlling a software application by means of the remote control based on the determined relative height.

13. The method as claimed in claim 12, further comprising detecting movement of the remote control in at least two orthogonal directions in the horizontal plane using acceleration sensors.

14. The method as claimed in claim 12, wherein the calibration information is determined further depending on a relation between outputs of the pressure sensor of the remote control and the reference pressure sensor when a difference between an altitude of the pressure sensor of the remote control and an altitude of the reference pressure sensor is given by a defined calibration height.

15. A gaming system comprising:
　　a game console hosting a game software application;
　　a remote control, wherein the remote control comprises
　　　　a hand-held controller having a control function and being configured to control the game software application running on the game console, and
　　　　a pressure sensor configured to provide relative altitude information adapted to be used in the control of the game software application;
　　a reference pressure sensor provided in the game console or in a separate unit at a fixed height; and
　　a processor, which is adapted to determine a relative height of the remote control with respect to the reference pressure sensor based on an output of the pressure sensor of the remote control and an output of the reference pressure sensor.

* * * * *